United States Patent [19]
Tran

[11] Patent Number: 6,016,533
[45] Date of Patent: Jan. 18, 2000

[54] WAY PREDICTION LOGIC FOR CACHE ARRAY

[75] Inventor: Thang M. Tran, Austin, Tex.

[73] Assignee: Advanced Micro Devices, Inc., Sunnyvale, Calif.

[21] Appl. No.: 08/991,846

[22] Filed: Dec. 16, 1997

[51] Int. Cl.[7] .............................. G06F 12/00; G06F 13/00
[52] U.S. Cl. .......................... 711/128; 711/118; 711/137; 712/239
[58] Field of Search ............................... 711/3, 118, 121, 711/128, 130, 137; 712/237, 239

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,764,861 | 8/1988 | Shibuya . |
| 4,807,115 | 2/1989 | Torng . |
| 4,853,840 | 8/1989 | Shibuya . |

(List continued on next page.)

FOREIGN PATENT DOCUMENTS

| | | |
|---|---|---|
| 0381471 | 8/1990 | European Pat. Off. . |
| 0459232 | 12/1991 | European Pat. Off. . |
| 0467152A2 | 1/1992 | European Pat. Off. . |
| 0651321A1 | 5/1995 | European Pat. Off. . |
| 0675443A1 | 10/1995 | European Pat. Off. . |
| 0259095 | 3/1998 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

XP 000525181 Calder, et al, "Next Cache Line and Set Prediction," Department of Computer Science, University of Colorado, 8345 Computer Architecture News, May 23, 1995, No. 2, pp. 287–296.

XP 000397920 Uchiyama, et al, "The Gmicro/500 Superscalar Microprocessor with Branch Buffers," 8207 IEEE Micro, Oct. 13, 1993, No. 5, pp. 12–22.

Intel, "Chapter 2: Microprocessor Architecture Overview," pp. 2–1 through 2–4, 1994.

Slater, M., "AMD's Microprocessor K5 designed to Outrun Pentium" (Microprocessor Report, vol. 8, No. 14, Oct. 24, 1994, 7 pages.

Rupley, et al, "P6: The Next Step?" PC Magazine, Sep. 12, 1995, 16 pages.

Halfhill, "AMD K6 Takes on Intel P6," BYTE Magazine, Jan. 1996, 4 pages.

Patterson, et al, "Computer Architecture: A Quantitative Approach," Section 8.3, pp. 408–425, published by Morgan Kaufmann Publishers, Inc., 1990.

"Intel Architecture Software Developer's Manual, vol. 1: Basic Architecture", Intel Corporation, Prospect IL, 1996, 1997, Chapter 8: Programming With The Intel MMX™ Technology, pp. 8–1 through 8–15.

(List continued on next page.)

Primary Examiner—Tuan V. Thai
Attorney, Agent, or Firm—Conley, Rose & Tayon; Lawerence J. Merkel

[57] ABSTRACT

A set-associative cache memory configured to use multiple portions of a requested address in parallel to quickly access data from a data array based upon stored way predictions. The cache memory comprises a plurality of memory locations, a plurality of storage locations configured to store way predictions, a decoder, a plurality of pass transistors, and a sense amp unit. A subset of the storage locations are selected according to a first portion of a requested address. The decoder is configured to receive and decode a second portion of the requested address. The decoded portion of the address is used to select a particular subset of the data array based upon the way predictions stored within the selected subset of storage locations. The pass transistors are configured select a second subset of the data array according to a third portion of the requested address. The sense amp unit then reads a cache line from the intersection of the first subset and second subset within the data array.

17 Claims, 7 Drawing Sheets

U.S. PATENT DOCUMENTS

| | | |
|---|---|---|
| 4,858,105 | 8/1989 | Kuriyama et al. . |
| 4,928,223 | 5/1990 | Dao et al. . |
| 4,943,908 | 7/1990 | Emma et al. . |
| 4,984,154 | 1/1991 | Hanatani et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,142,634 | 8/1992 | Fite et al. . |
| 5,185,868 | 2/1993 | Tran . |
| 5,226,126 | 7/1993 | McFarland et al. . |
| 5,226,130 | 7/1993 | Favor et al. . |
| 5,230,068 | 7/1993 | Van Dyke et al. . |
| 5,235,697 | 8/1993 | Steely, Jr. et al. . |
| 5,283,873 | 2/1994 | Steely, Jr. et al. . |
| 5,327,547 | 7/1994 | Stiles et al. . |
| 5,345,569 | 9/1994 | Tran . |
| 5,381,533 | 1/1995 | Peleg et al. . |
| 5,418,922 | 5/1995 | Liu . |
| 5,423,011 | 6/1995 | Blaner et al. . |
| 5,454,117 | 9/1995 | Puziol et al. . |
| 5,485,587 | 1/1996 | Matsuo et al. . |
| 5,521,306 | 5/1996 | Tran . |
| 5,619,676 | 4/1997 | Fukuda et al. ............................ 711/137 |
| 5,640,532 | 6/1997 | Thome et al. . |
| 5,651,125 | 7/1997 | Witt et al. . |
| 5,701,435 | 12/1997 | Chi . |
| 5,752,069 | 5/1998 | Roberts et al. . |
| 5,764,946 | 6/1998 | Tran . |
| 5,835,951 | 11/1998 | McMahan ................................ 711/145 |

OTHER PUBLICATIONS

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

WAY PREDICTION LOGIC FOR CACHE ARRAY

BACKGROUND OF THE INVENTION

1. Field of the Invention

This invention relates to way prediction for cache arrays that may be employed within superscalar microprocessors.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a high bandwidth, low latency memory system is required to provide instructions to the superscalar microprocessor (i.e., a memory system that can provide a large number of bytes in a short period of time). Without a high bandwidth, low latency memory system, the microprocessor would spend a large number of clock cycles waiting for instructions to be provided and then would execute the received instructions in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells form a memory system that provides a relatively small number of bytes in a relatively long period of time, i.e., a low bandwidth, high latency memory system.

Because superscalar microprocessors are typically not configured into a computer system with a memory system having sufficient bandwidth to continuously provide instructions and data for execution, superscalar microprocessors are often configured with caches. Caches are small, fast memories that are either included on the same monolithic chip with the microprocessor core, or are coupled nearby. Typically, data and instructions that have recently been used by the microprocessor are stored in these caches and are later written back to memory after the instructions and data have not been accessed by the microprocessor for some time. The amount of time necessary before instructions and data are vacated from the cache and the particular algorithm used therein varies significantly among microprocessor designs and are well known. Data and instructions may be stored in a shared cache (referred to as a combined or unified cache). Also, data and instructions may be stored in distinctly separated caches, typically referred to as an instruction cache and a data cache.

Retrieving data from main memory is typically performed in superscalar microprocessors through the use of a load instruction. The load instruction may be explicit, wherein the load instruction is actually coded into the software being executed or implicit, wherein some other instruction (an add, for example) directly requests the contents of a memory location as part of its input operands. Storing the results of instructions back to main memory is typically performed through the use of a store instruction. As with the aforementioned load instruction, the store instruction may be explicit or implicit. As used herein, "memory operations" will be used to refer to both load and store instructions.

In modern superscalar microprocessors, memory operations are typically executed in one or more load/store units. These units execute the instruction, access the data cache (if one exists) attempting to find the requested data, and handle the result of the access. As described above, data cache access typically has one of two results: a miss or a hit.

To increase the percentage of hits, many superscalar microprocessors use caches organized into "set-associative" structures. In a set-associative structure, the cache is configured into two parts, a data array and a tag array. Both arrays are two-dimensional and are organized into rows and columns. The column is typically referred to as the "way." Thus a four-way set-associative cache would be configured with four columns. A set-associative cache is accessed by specifying a row in the data array and then examining the tags in the corresponding row of the tag array. For example, when a load/store unit searches the data cache for data residing at a particular address, a number of bits from the address are used as an "index" into the cache. The index selects a particular row within the data array and a corresponding row within the tag array. The number of address bits required for the index are thus determined by the number of rows configured into the cache. The tags addresses within the selected row are examined to determine if any match the requested address. If a match is found, the access is said to be a "hit" and the data cache provides the associated data bytes from the data array. If a match is not found, the access is said to be a "miss." When a miss is detected, the load/store unit causes the requested data bytes to be transferred from the memory system into the data array. The address associated with the data bytes is then stored in the tag array.

It is well known that set-associative caches provide better "hit rates" (i.e., a higher percentage of accesses to the cache are hits) than caches that are configured as a linear array of storage locations (typically referred to as a direct-mapped configuration). The hit rates are better for set-associative caches because data bytes stored at multiple addresses having the same index may be stored in a set-associative cache simultaneously, whereas a direct-mapped cache is capable of storing only one set of data bytes per index. For example, a program having a loop that accesses two addresses with the same index can store data bytes from both addresses in a set-associative data cache, but will have to repeatedly reload the two addresses each time the loop is executed in a microprocessor having a direct-mapped cache. The hit rate in a data cache is important to the performance of the superscalar microprocessor because when a miss is detected the data must be fetched from the memory system. The microprocessor will quickly become idle while waiting for the data to be provided. Unfortunately, set-associative caches require more access time than direct-mapped caches since the tags must be compared to the requested address and the resulting hit or miss information must then be used to select which data bytes should be conveyed out of the data cache. As the clock frequencies of superscalar microprocessors increase, there is less time to perform the tag comparison and way selection. Depending upon the clock frequency, more than one clock cycle may be required to provide data from the data cache. This is particularly a problem for x86 compatible microprocessors which perform more memory accesses because of the limited number of registers. Therefore, a data cache having the advantages of a set-associative cache with faster access times is desirable.

SUMMARY OF THE INVENTION

The problems outlined above are in large part solved by a cache memory employing way prediction in accordance with the present invention. The cache memory uses portions of the requested address in parallel to reduce way prediction and data array access time. Advantageously, this may enable faster data access while retaining the performance benefits of a set-associative cache. Furthermore, die space and power consumption may advantageously be reduced through the use of one sense amp unit instead of multiple sense amp units (i.e., one sense amp unit per way or column). The term "sense amp unit" refers to a group of sense amps configured to read a cache line from a memory location within the cache. A "sense amp" is a pair of transistors that are configured to read a single bit from a memory location within the cache.

Broadly speaking, one embodiment of the present invention contemplates a cache memory comprising: a plurality of memory locations, a plurality of storage locations configured to store way predictions, a decoder, a plurality of pass transistors, and a sense amp unit. A first portion of a requested address is used to select a set of way predictions stored within the plurality of storage locations. The decoder is coupled to the memory locations and the storage locations. The decoder is configured to receive and decode a second portion of the requested address and select a first subset of memory locations based upon the decoded second portion of the requested address and the selected set of way predictions. The pass transistors are coupled to the plurality of memory locations and are configured to receive a third portion of the requested address. The pass transistors are configured to select a second subset of memory locations based upon the third portion of the requested address. The sense amp unit is coupled to the plurality of pass transistors and is configured to read the contents of any memory locations that are located within the intersection of the first subset and the second subset.

In one embodiment, the second portion of the requested address and the third portion of said requested address may be the same portion of the requested address, and the decoder may be configured to select a subset of way predictions from the selected set based upon said second portion of said requested address.

In another embodiment, the cache memory comprises: a plurality of memory locations, a plurality of storage locations configured to store way predictions, a decoder, a plurality of pass transistors, and a sense amp unit. A first portion of the requested address is used to select a first subset of said plurality of memory locations based upon the way predictions stored in the storage locations. The decoder is coupled to the plurality of memory locations and is configured to receive and decode a second portion of the requested address. A second subset of the memory locations are selected based upon the decoded second portion of requested address. The plurality of pass transistors are coupled to the plurality of memory locations and are configured to receive a third portion of the requested address. A third subset of memory locations is selected based upon a third portion of said requested address. The sense amp unit is coupled to the plurality of pass transistors and is configured to read the contents of a particular memory location that is within the first subset, the second subset, and the third subset.

In one embodiment, the memory locations are logically configured into rows, columns, and ways, wherein the first subset is a particular way, the second subset is a particular row, and the third subset is a particular column. Furthermore, in another embodiment the first portion of the index address and the third portion of the index address may be the same portion of the requested address.

In another embodiment, a method for accessing a cache array is contemplated. One embodiment of the method comprises receiving a requested address and selecting a way prediction from a way prediction array based upon a first portion of a requested address. A second portion of the requested address is decoded and a first subset of the cache array is selected based upon the selected way prediction and the decoded second portion of said requested address. A third portion of the requested address is decoded, and a second subset of the cache array is selected by activating a particular set of pass transistors within a plurality of pass transistors coupled to the cache array. The contents of said cache array that are stored within the intersection of said first subset and said second subset are then read and output.

In one embodiment the method further comprises reading a plurality of way predictions from the way prediction array and selecting a particular one of the plurality of way predictions based upon the decoding of the second portion of the requested address.

BRIEF DESCRIPTION OF THE DRAWINGS

Other objects and advantages of the invention will become apparent upon reading the following detailed description and upon reference to the accompanying drawings in which.

Figure 1:
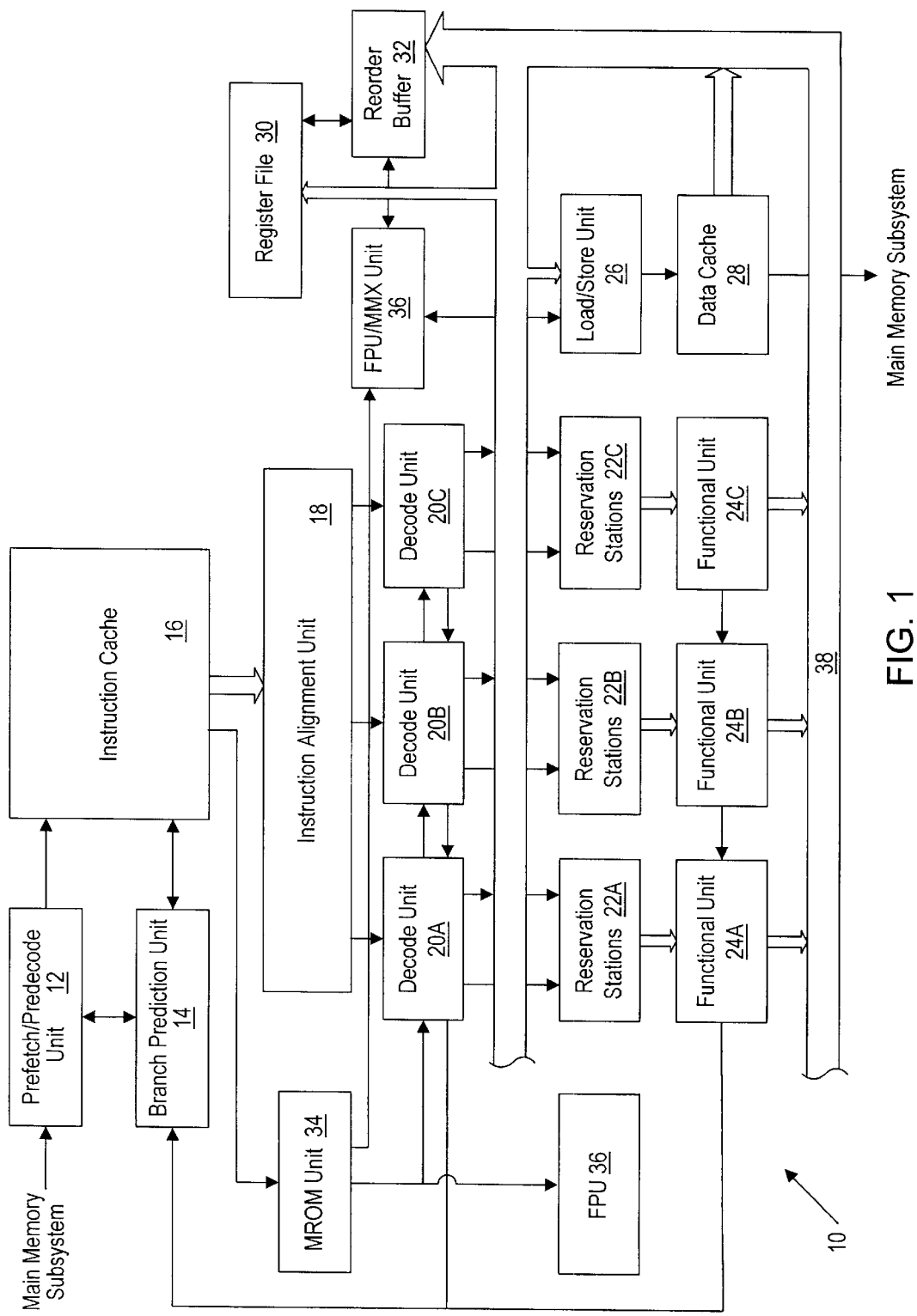
FIG. 1 is a block diagram of a superscalar microprocessor employing a data cache in accordance with the present invention.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20 and FPU/MMX unit 36. The terms "FPU" and "FPU/MMX unit" are used interchangeably and should be understood to include floating point units with or without functional pipelines capable of performing MMX instructions.

Instruction cache 16 is a high speed cache memory configured to store instructions. Instructions are fetched from instruction cache 16 and dispatched to decode units 20. In one embodiment, instruction cache 16 is configured to store up to 64 kilobytes of instructions in a 4-way set-associative structure having 32-byte lines (a byte comprises 8 binary bits). Alternatively, 2-way set-associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set-associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20 or FPU/MMX unit 36 in the case of floating point instructions. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. If decode units 20 detect a floating point instruction, the instruction is dispatched to FPU/MMX unit 36.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a fuctional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that FPU/MMX unit 36 may also be employed to accommodate floating point and multimedia operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set-associative structure. Similar to instruction cache 16, data cache 28 may employ a way prediction mechanism. It is understood that data cache 28 may be implemented in a variety of specific memory configurations.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
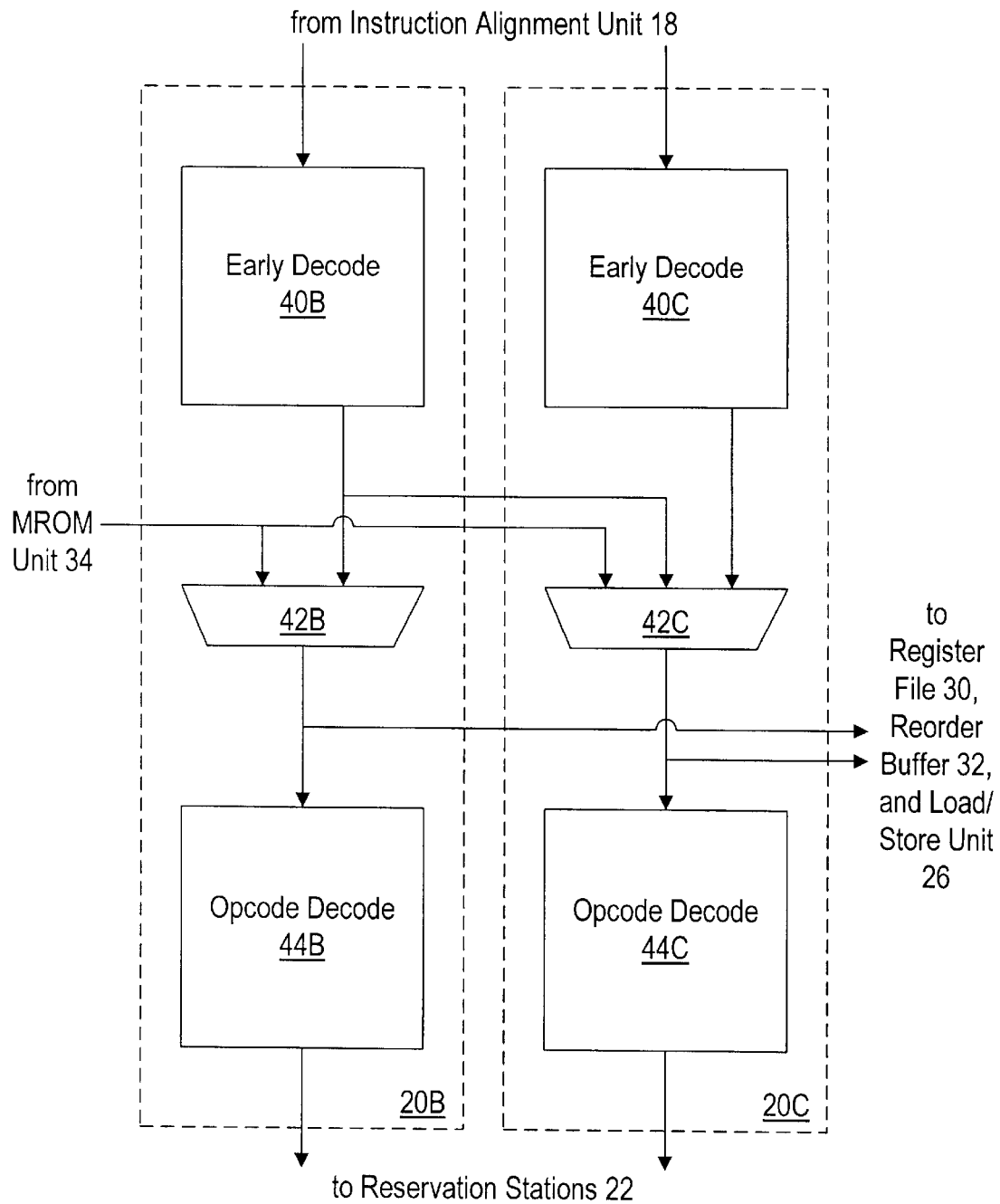
FIG. 2 is a block diagram showing details of one embodiment of the decode units depicted in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:
 (i) merge the prefix bytes of the instruction into an encoded prefix byte;
 (ii) decode unconditional branch instructions (which may include the unconditional jump, the CALL, and the RETURN) which were not detected during branch prediction;
 (iii) decode source and destination flags;
 (iv) decode the source and destination operands which are register operands and generate operand size information; and
 (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
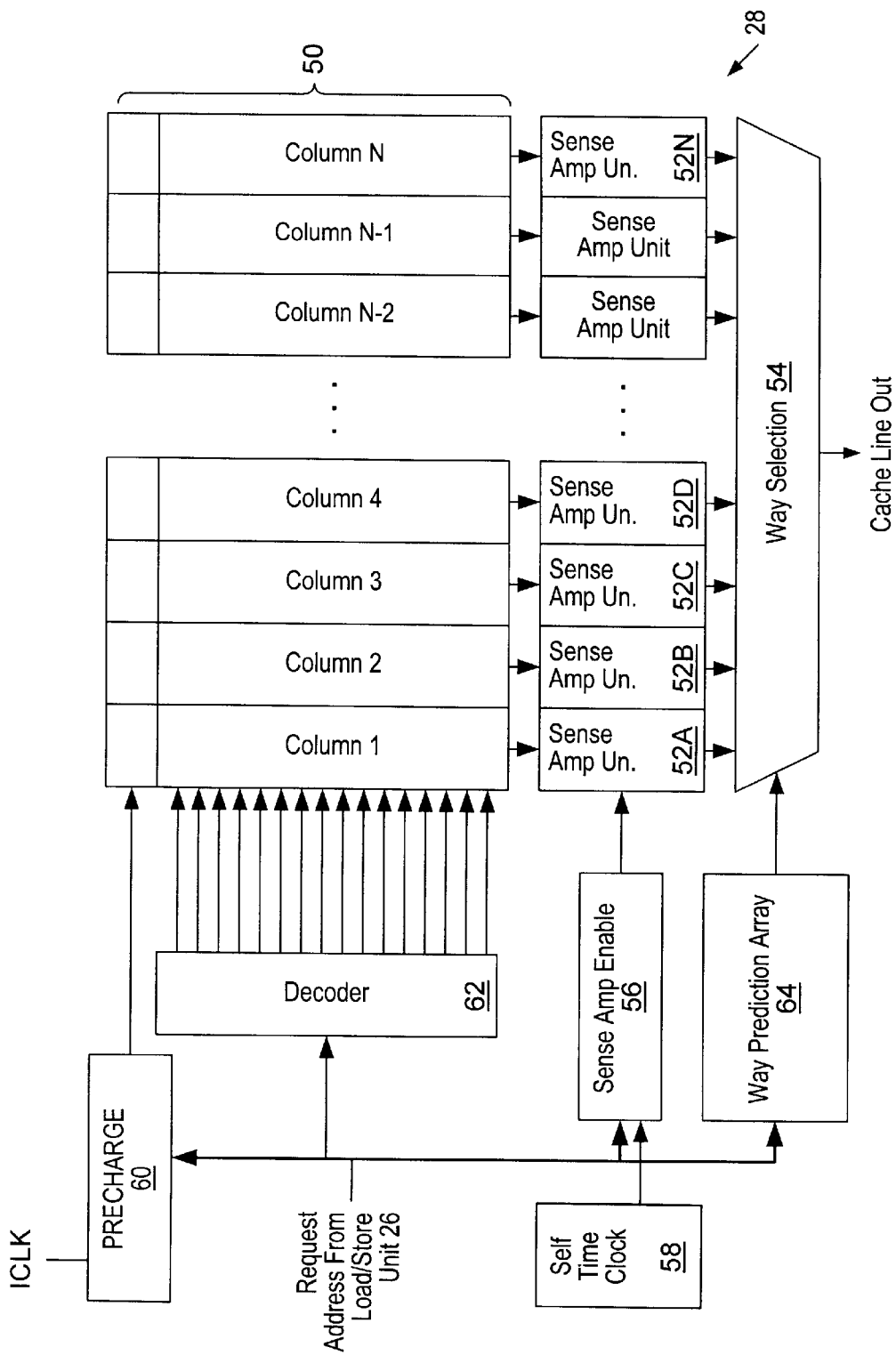
FIG. 3 is a diagram illustrating one embodiment of the data cache in FIG. 1.

Turning next to FIG. 3, a block diagram of one embodiment of data cache 28 is shown. Data cache 28 comprises a data array 50, which in turn comprises a plurality of memory locations configured into columns. Each column is coupled to a corresponding sense amp unit 52A–52N. Sense amp units 52A–52N are coupled to way selection multiplexer 54 and sense amp enable unit 56. Sense amp enable unit 56 is in turn coupled to self-time clock 58, precharge unit 60 and decoder 62.

Data cache 28 operates by precharging the memory locations within data array 50 with precharge unit 60. Precharge unit 60 is triggered by a clock signal ICLK. After precharge unit 60 has begun precharging the memory locations, decoder 62 receives a requested address from load/store unit 26. Once the input address is decoded, a particular row of memory locations is selected. After self-time clock 58 indicates that enough time has passed for memory locations 50 to be precharged, sense amp enable unit 56 enables sense amp units 52A–52N. Once enabled, sense amp units 52A–52N read the precharged memory locations in the selected row. The data from one memory location is then selected for output by way selection multiplexer 54. Way selection multiplexer 54 selects a particular column based upon a way prediction read from way prediction array 64. The memory location at the intersection of the selected row and column is then read and output. As way prediction array 64 is typically much smaller than a tag array, the way prediction is available before the actual tag comparison results. Advantageously, the cache read time can be shortened if the way prediction is correct.

Once the tag comparison results are available, they are used to verify the way prediction. If the way prediction was incorrect, the data output by way selection unit 54 is invalidated and the access is performed again using the correct way from the tag comparison. Way prediction array 64 is also updated with the correct way.

Figure 4:
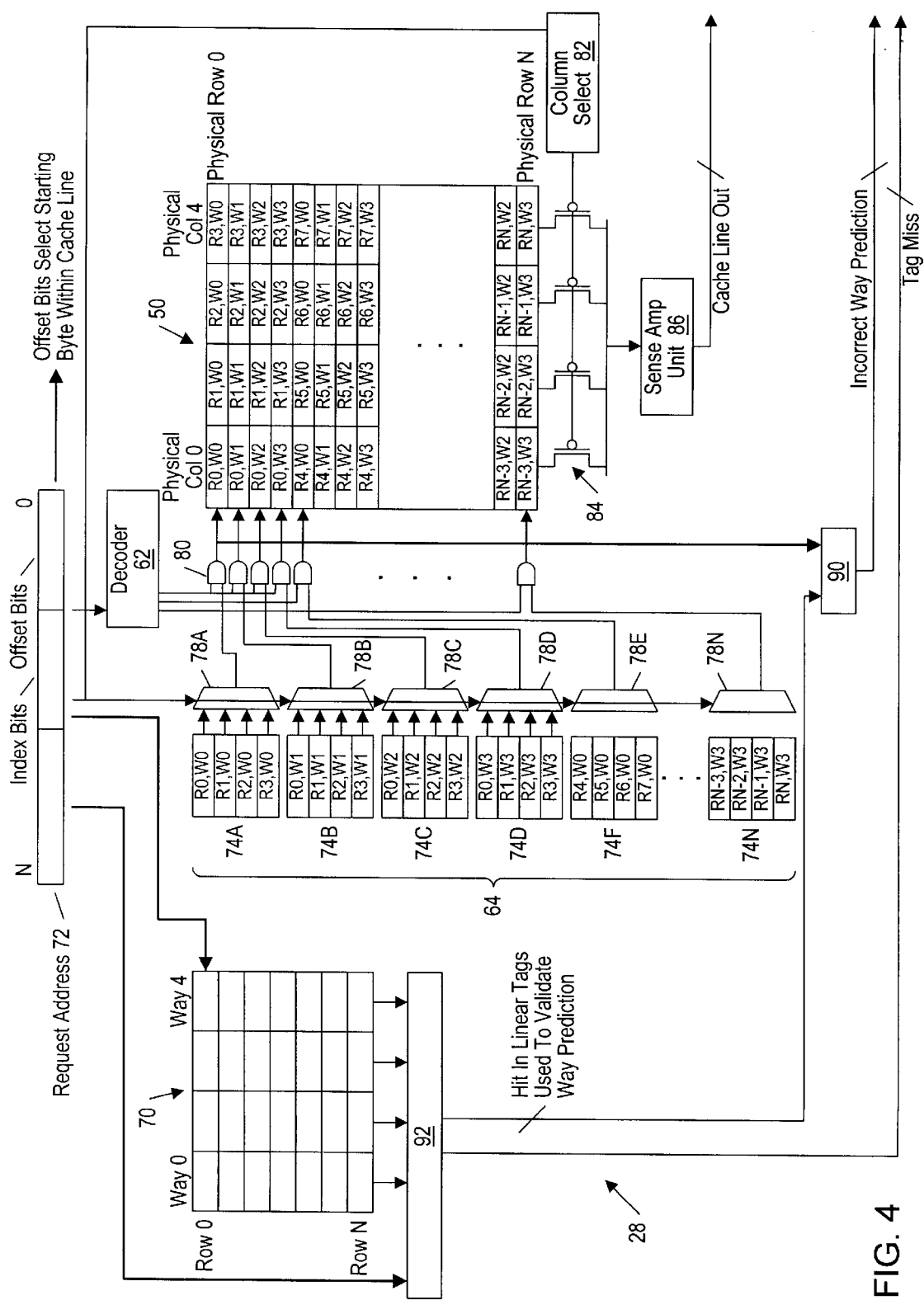
FIG. 4 is a diagram illustrating another embodiment of the data cache in FIG. 1.

Turning now to FIG. 4, another embodiment of data cache 28 is shown. In this embodiment, data cache 28 is a 4-way set-associative cache comprising a data array 50, a way prediction array 64, and a tag array 70. Advantageously, data array 50 is structured so that the memory locations associated with a row of tags in tag array 70 are actually in the same physical column instead of the same physical row. This allows way prediction and column selection to be done in parallel, which may advantageously eliminate the need for a separate sense amp unit for each column. The terms "physical row" and "physical column" refer to the architectural configuration of data array 50. The terms do not denote any actual physical characteristics, but rather they indicate that the internal arrangement of data array 50 differs from that of tag array 70. For example, data corresponding to the tag located at way 1, row 0 in tag array 70 is not stored at physical column 1, physical row 0 in data array 50. To the contrary, data cache 28 stores the data at physical column 0, physical row 1. Thus the data is said to be stored at logical way 1, logical row 0 and physical column 0, physical row 1. The logical coordinates denote the relationship of the data to the tags in tag array 70, while the physical coordinates denote the relative location within data array 50.

As shown in FIG. 4, each array 50, 64, and 70 is coupled to receive a portion of requested address 72. When data cache 28 receives a requested address, tag array 70, way prediction array 64, and data array 50 are accessed in parallel. Tag array 50 uses an index portion of requested address 72 to access a particular set of tags, which are conveyed to tag comparator 92. Tag comparator 92 receives a second portion of the requested address to compare with the selected set of tags. If one of the tags compares equal, there is a "hit" in the cache. Conversely, if none of the tags equal the second portion of the address, there is a "miss."

While tag array 70 is being accessed, way prediction array 64 is also being accessed. In this embodiment, way prediction array 64 is divided into a number of sections 74A–74N, each comprising a number of storage locations. When way prediction array 64 is accessed, a number of bits from the index portion of requested address 72 are used to select one storage location from each section 74A–74N. A number of bits from the index portion of requested address 72 are also used by decoder 62 to select a number of sections 74A–74 (see below). For example, the first storage location in each section 74A–74-N may be selected using multiplexers 78A–78N. As depicted in FIG. 4, each storage location corresponds to a particular memory location within data array 50. For example the fifth storage location (R0, W1) within way prediction array 64 is associated with the memory location located at the intersection of physical column 0 and physical row 1 within data array 50. That memory location (R0, W1) is associated with the tag in tag array 70 stored at the intersection of row 0 and way 1. As used herein, the term memory location refers to a memory structure capable of storing a cache line.

Way predictions are stored within way prediction array 64 in order relative to logical row and logical way in a one-hot encoded format. Thus each storage location stores a single bit. For example, if logical row 2 is predicted to hit in logical way 3, then the contents of the way prediction array will be as follows:

| | |
|---|---|
| Section 74A: (R2,W0) = | 0 |
| Section 74B: (R2,W1) = | 0 |
| Section 74C: (R2,W2) = | 0 |
| Section 74D: (R2,W3) = | 1 |

In parallel with the access of way prediction array 64, decoder 62 receives and decodes a second set of bits from the index portion of requested address 72. The decoded address is also one-hot encoded, and each bit is provided as input to a predetermined number of AND gates 80. In the embodiment illustrated in FIG. 4, four AND gates are controlled by each bit of the decoded address. As noted in the example above, section 74D is the only section to have an selected way prediction that is asserted and an asserted AND gate. Therefore, physical row 3 is the only row selected in data array 50 for this example.

Also in parallel with the access of way prediction array 64, column select unit 82 decodes the same set of bits from the index portion of the requested address used by way prediction array 64. Column select unit 82 uses the decoded bits to enable one of the plurality of pass transistors 84. Enabling a set of pass transistors selects a physical column within data array 50. Note that each pass transistor shown in FIG. 4 represents a set of transistors. The number of transistors in a set is determined by the number of bit in a cache line. Once a set of pass transistors 84 are enabled, the selected column is read by sense amp unit 86. Continuing with the example above, if an address corresponding to row 2 of the tag array was requested, column select unit 82 would decode the address and enable the set of pass transistors coupled to physical column 2 of data array 50. Thus the contents of the memory location at the intersection of physical column 2 and physical row 3, i.e., (R2,W3), may be read by sense amp unit 86.

As noted above, once physical row 3 and physical column 2 are selected, sense amp unit 86 will be able to read the cache line stored within the memory location located at the intersection of physical row 3 and column 2 in the data array. As only one memory location is coupled to sense amp unit 86, only one sense amp unit is needed. In contrast, the embodiment in FIG. 3 may require multiple sense amp units, i.e., one per column. Reducing the number of sense amp units may advantageously save space and reduce power consumption. Furthermore, the process of selecting a way based on the way prediction is performed while the memory locations are waiting to be read, i.e., during precharge. Advantageously, once the memory locations are charged and can be read by sense amp unit 86, the data can be output without the added delay of way selection. In addition, implementation of way prediction within decoder 62 may be more convenient and may require less space.

Once the cache line is read and output by sense amp unit 86, the offset bits from request address 72 are used to select the requested bytes from the cache line. If the requested address hits in the tag cache, the way prediction is verified by comparator 90 which receives the way prediction after it is selected from way prediction array 64. If the way prediction was incorrect, an invalid signal is dispatched to cancel the data that was output, way prediction array 64 is updated with the correct way information, and the correct data is selected and output.

Pass transistors 84 perform a "multiplexing" function that selects a column prior to sense amp unit 86 reading the selected memory location. This configuration may advantageously decrease the number of sense amp units required when compared with the configuration illustrated in FIG. 3. This configuration may also speed cache access times because column selection is performed in parallel with way prediction selection. Further note that while data cache 28 is depicted as a four-way set-associative cache and way prediction array 64 is depicted as having sections comprising four storage locations, other configurations are also contemplated, for example an eight-way set-associative cache structure. In addition, the number of columns in data array 50 need not equal the number of ways configured into data array 50. In such a configuration, however, column select unit 82 and multiplexers 78A–78N may no longer receive the same number of bits from requested address 72.

Figure 5:
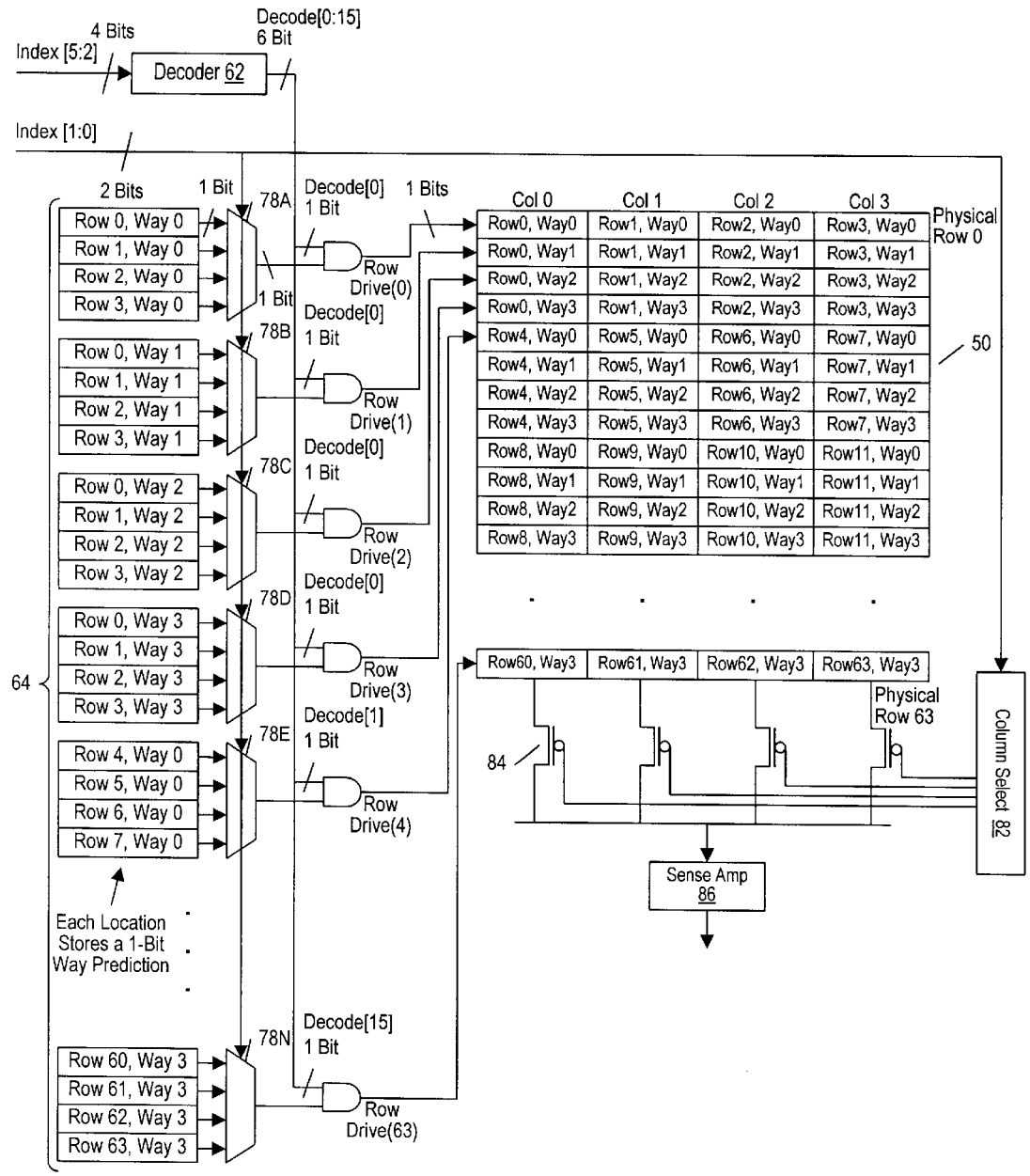
FIG. 5 is a diagram illustrating more details of the embodiment of the data cache shown in FIG. 4.

Turning now to FIG. 5, more detail of one embodiment of data cache 28 is shown. In the embodiment shown, data cache 28 is configured as four-way set-associative and is accessed by six bits from the index portion of the requested address. The two least significant bits from the index portion of the requested address are used by column select unit 82 to select a column within data array 50 and way prediction array 64 to select one storage location from each section. The next five bits from the index portion of the requested address are used by decoder 62 to select physical rows within data array 50. The number of bits used to index into data array 50 may be determined by the number of rows in data array 50. Similarly, the number of storage locations in each section within way prediction array 64 may be determined by the number of ways and columns in data array 50 and tag array 70.

Figure 6:
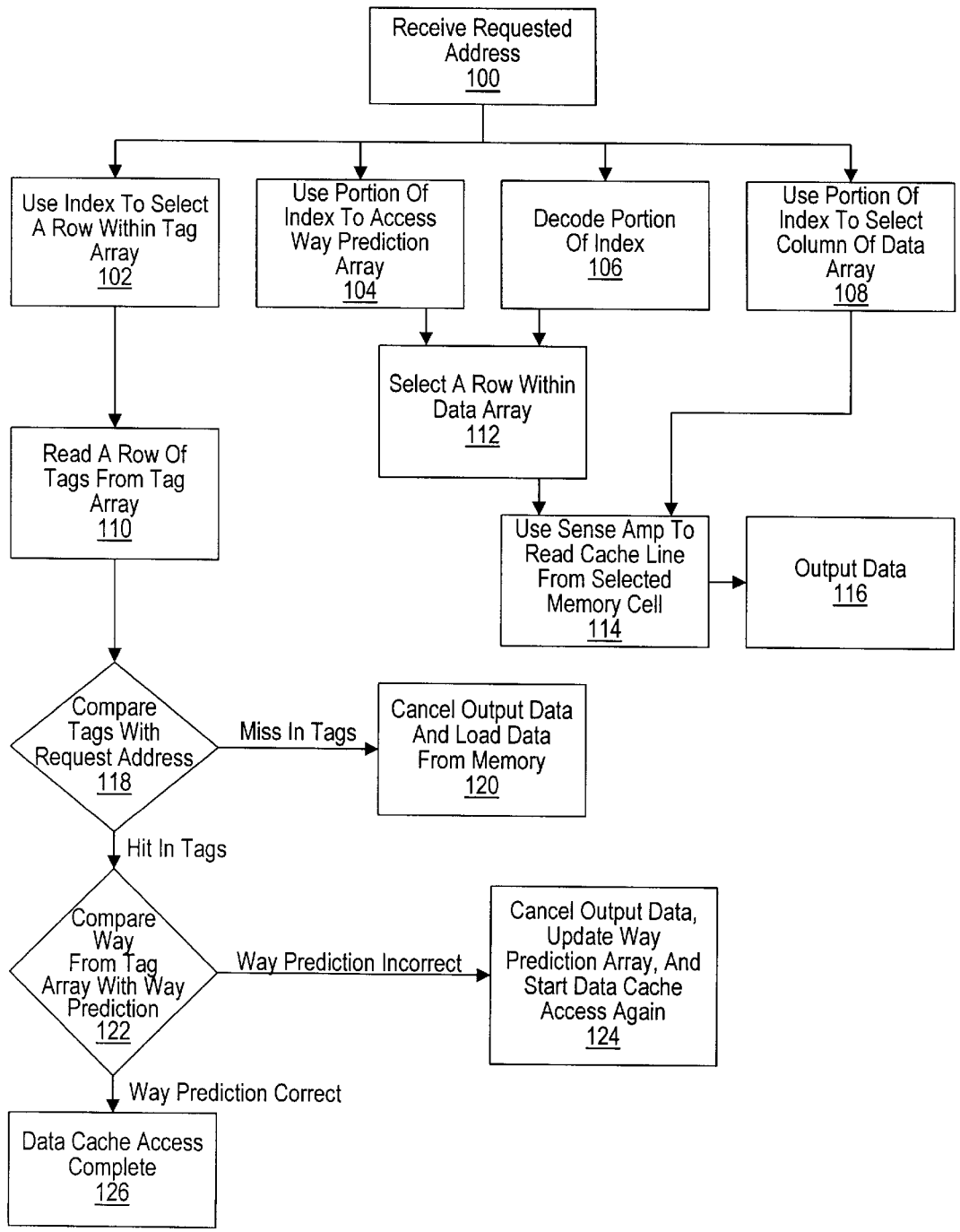
FIG. 6 is a flowchart depicting one embodiment of a method for accessing the data cache illustrated in FIG. 4.

Turning now to FIG. 6, a flowchart of the method embodied in data cache 28 is shown. One the requested address is received (block 100), four operations begin in parallel:

(a) the index portion of the requested address is used to select a row within the tag array (block 102);

(b) a portion of the index is used to access the way prediction array (block 104);

(c) a portion of the index is decoded (block 106); and (d) a portion of the index is used to select a particular column within the data (block 108).

After the way prediction array is accessed and the index has been decoded, a row is selected within the data array (block 112). The sense amp units are then enabled to read a cache line from the selected memory location located at the intersection of the selected row and column (block 114). This data is then output for use by other parts of the microprocessor (block 116).

After the selected row of tags are read from the tag array (block 110), the tags are compared with the remainder of the requested address excluding the offset bits and index bits (block 118). If there is no mach found in the tags, a cache miss occurs. The output data is canceled and the requested data is fetched from main memory (block 120). If there is a hit in the tags, the way prediction is checked with the actual way (block 122). If the way prediction is incorrect, the output is canceled, the way prediction array is updated, and the correct way is read from the data array (block 124). If the way prediction way correct, the data output was correct (block 126). The data cache is pipelined so that the next access is started before the validity of the previous way prediction is determined.

Figure 7:
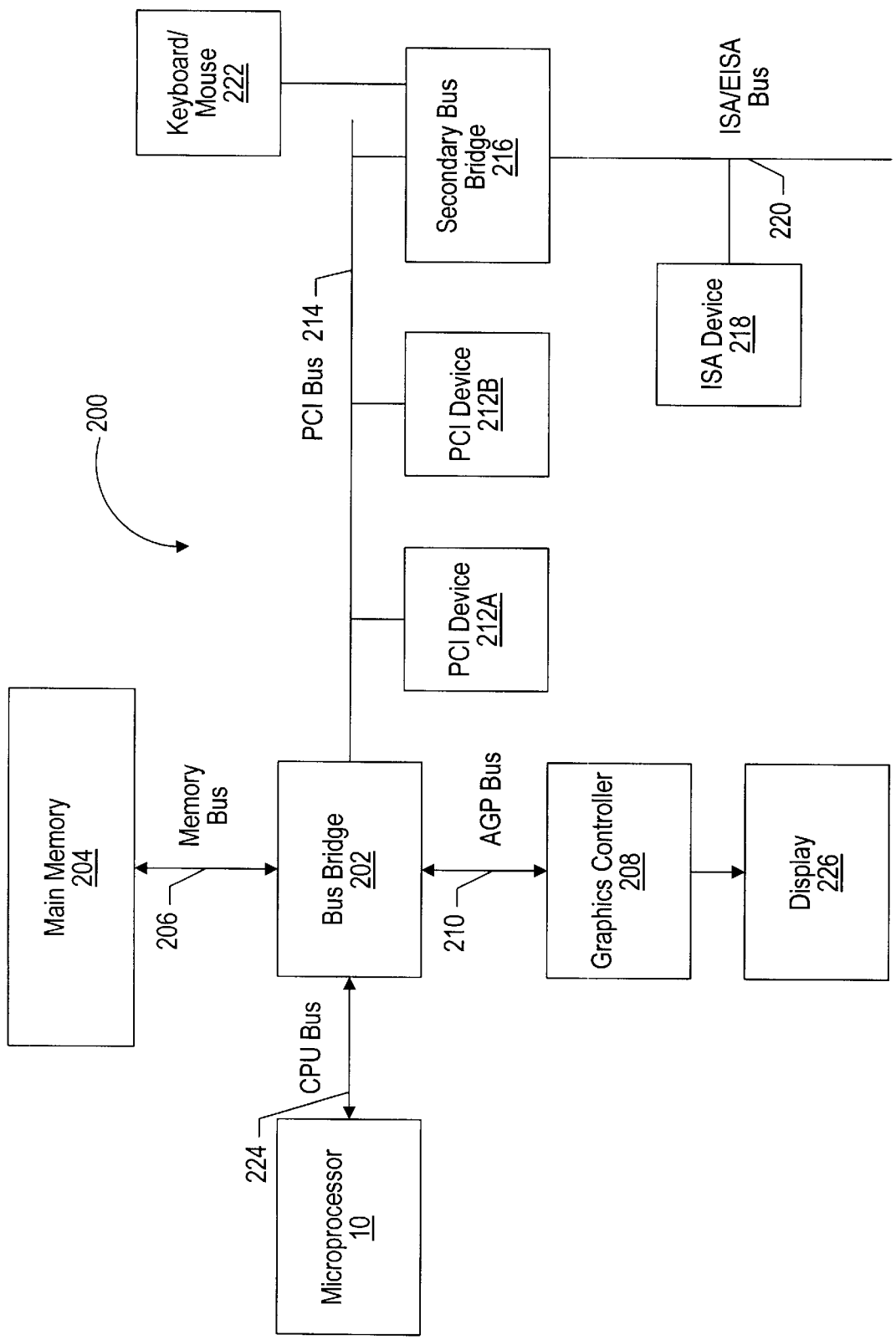
FIG. 7 is a block diagram of one embodiment of a computer system configured to utilize the microprocessor of FIG. 1.

Turning now to FIG. 7, a block diagram of a computer system 200 including microprocessor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

In addition to providing an interface to an ISA/EISA bus, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bridge logic unit 102 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 302 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1

| x86 Fast Path, Double Dispatch, and MROM Instructions | |
|---|---|
| X86 Instruction | Instruction Category |
| AAA | MROM |
| AAD | MROM |
| AAM | MROM |
| AAS | MROM |
| ADC | fast path |

TABLE 1-continued x86 Fast Path, Double Dispatch, and MROM Instructions

| X86 Instruction | Instruction Category |
|---|---|
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |

TABLE 1-continued x86 Fast Path, Double Dispatch, and MROM Instructions

| X86 Instruction | Instruction Category |
|---|---|
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |

TABLE 1-continued x86 Fast Path, Double Dispatch, and MROM Instructions

| X86 Instruction | Instruction Category |
|---|---|
| XCHG | MROM |
| XLAT | fast path |
| XLATB | fast path |
| XOR | fast path |

Note:
Instructions including an SIB byte are also considered double dispatch instructions.

A data cache memory capable of faster memory array access has been disclosed. The data cache may advantageously retain the benefits of a set-associative structure while improving data access time. A method for operating a data cache has also been disclosed which may advantageously improve memory access times. Numerous variations and modifications will become apparent to those skilled in the art once the above disclosure is fully appreciated. It is intended that the following claims be interpreted to embrace all such variations and modifications.

What is claimed is:

1. A cache array comprising:
   a plurality of memory locations;
   a plurality of storage locations, wherein each storage location is configured to store a way prediction, wherein a first portion of a requested address selects a set of way predictions;
   a decoder coupled to said plurality of memory locations and said plurality of storage locations, wherein said decoder is configured to receive and decode a second portion of said requested address, wherein said decoder is configured to select a first subset of said plurality of memory locations based upon said second portion of said requested address and said set of way predictions;
   a plurality of pass transistors coupled to said plurality of memory locations, wherein said plurality of pass transistors are configured to receive a third portion of said requested address, wherein said plurality of pass transistors are configured to select a second subset of said plurality of memory locations based upon said third portion of said requested address;
   a sense amp unit coupled to said plurality of pass transistors, wherein said sense amp unit is configured to read the contents of any memory locations that are located within an intersection of said first subset and said second subset; and
   a column select decoder coupled to said plurality of pass transistors and configured received and decode said third portion of said requested address, wherein said column select decoder is configured to enable a set of pass transistor within said plurality of pass transistors based upon said decoded third portion of said requested address.

2. The cache array as recited in claim 1, wherein said second portion of said requested address and said third portion of said requested address are the same portion of said requested address.

3. The cache array as recited in claim 1, wherein said decoder is configured to select a subset of way predictions from said set of way predictions based upon said second portion of said requested address.

4. The cache array as recited in claim 3, wherein said decoder is configured to select said first subset of said plurality of memory locations based upon said second portion of said requested address and said subset of way predictions.

5. The cache array as recited in claim 4, wherein said decoder and said pass transistors are configured to operate in a parallel with respect to time.

6. The cache array as recited in claim 1, wherein said way prediction is one-hot encoded.

7. The cache array as recited in claim 6, wherein each memory location stores a cache line.

8. The cache array as recited in claim 1, wherein the intersection of said first subset and said second subset comprises a particular memory location, wherein said particular memory location stores a cache line.

9. A cache array comprising:
   a plurality of memory locations;
   a plurality of storage locations, wherein each storage location is configured to store a way prediction, wherein a first portion of a requested address is used to access a particular stored way prediction, wherein said particular stored way prediction selects a first subset of said plurality of memory locations;
   a decoder coupled to said plurality of memory locations and said plurality of storage locations, wherein said decoder is configured to receive and decode a second portion of said requested address, wherein said decoder is configured to select a second subset of said plurality of memory locations based upon said second portion of said requested address;
   a plurality of pass transistors coupled to said plurality of memory locations, wherein said plurality of pass transistors are configured to receive a third portion of said requested address, wherein said plurality of pass transistors are configured to select a third subset of said plurality of memory locations based upon said third portion of said requested address;
   a sense amp unit coupled to said plurality of pass transistors, wherein said sense amp unit is configured to read the contents of a particular memory location that is within said first subset, said second subset, and said third subset; and
   a column select decoder coupled to said plurality of pass transistors and configured receive and decode said third portion of said requested address, wherein said column select decoder is configured to enable a set of pass transistor within said plurality of pass transistors based upon said decoded third portion of said requested address.

10. The cache array as recited in claim 9, wherein said plurality of memory locations are logically configured into rows, column, and ways, wherein said first subset is a particular way, wherein said second subset is a particular row, wherein said third subset is a particular column.

11. The cache array as recited in claim 10, wherein said way prediction is one-hot encoded.

12. The cache array as recited in claim 11, wherein said first portion of said requested address and said third portion of said requested address are the same portion of said requested address.

13. The cache array as recited in claim 12, wherein the intersection of said first subset, said second subset, and said third subset comprises one memory location, wherein one memory location stores a cache line.

14. The cache array as recited in claim 13, wherein said first portion of said requested address is used to access a plurality of stored way predictions.

15. The cache array as recited in claim 14, wherein said decoder is configured to select a second subset of said plurality of memory locations based upon said second portion of said requested address and said plurality of accessed way predictions.

16. A method for accessing a cache array comprising:

receiving a requested address;

selecting a way prediction from a way prediction array based upon a first portion of said requested address, decoding a second portion of said requested address, selecting a first subset of said cache array based upon said way prediction and said decoded second portion of said requested address;

configuring a column select decoder coupled to plurality of pass transistors for receiving and decoding a third portion of said requested address, wherein said column select decoder is configured to enable a set of said plurality of pass transistors based upon said decoded third portion of said requested address;

selecting a second subset of said cache array by activating a particular set of pass transistors within said plurality of pass transistors coupled to said cache array; and reading contents of said cache array that are stored within an intersection of said first subset and said second subset.

17. The method as recited in claim 16 further comprising reading a plurality of way predictions from said way prediction array and selecting a particular one of said plurality of way predictions based upon said decoding.

* * * * *

UNITED STATES PATENT AND TRADEMARK OFFICE
CERTIFICATE OF CORRECTION

PATENT NO. : 6,016,533
DATED : January 18, 2000
INVENTOR(S) : Thang M. Tran

It is certified that error appears in the above-identified patent and that said Letters Patent is hereby corrected as shown below:

Claim 10, col. 20, line 50, please delete "column", and insert --columns-- in place thereof.

Signed and Sealed this

Nineteenth Day of December, 2000

Attest:

Q. TODD DICKINSON

*Attesting Officer*  *Commissioner of Patents and Trademarks*